United States Patent
Heng et al.

(10) Patent No.: US 11,488,309 B2
(45) Date of Patent: Nov. 1, 2022

(54) ROBUST MACHINE LEARNING FOR IMPERFECT LABELED IMAGE SEGMENTATION

(71) Applicant: The Chinese University of Hong Kong, Hong Kong (CN)

(72) Inventors: Pheng-Ann Heng, Hong Kong (CN); Cheng Xue, Hong Kong (CN); Qi Dou, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 238 days.

(21) Appl. No.: 17/005,120

(22) Filed: Aug. 27, 2020

(65) Prior Publication Data

US 2022/0067940 A1    Mar. 3, 2022

(51) Int. Cl.
| | | |
|---|---|---|
| G06T 7/10 | (2017.01) | |
| G06N 3/04 | (2006.01) | |
| G06T 5/00 | (2006.01) | |
| G06N 3/08 | (2006.01) | |
| G06V 20/70 | (2022.01) | |

(52) U.S. Cl.
CPC .............. *G06T 7/10* (2017.01); *G06N 3/0454* (2013.01); *G06N 3/084* (2013.01); *G06T 5/003* (2013.01); *G06V 20/70* (2022.01); *G06T 2207/20081* (2013.01); *G06T 2207/20084* (2013.01)

(58) Field of Classification Search
CPC .............. G06T 7/10–187; G06T 5/003; G06T 2207/20081; G06T 2207/20084; G06V 20/70; G06N 3/0454; G06N 3/084
See application file for complete search history.

(56) References Cited

U.S. PATENT DOCUMENTS

| | | | | |
|---|---|---|---|---|
| 2021/0248427 | A1* | 8/2021 | Guo | G06V 10/82 |
| 2021/0374547 | A1* | 12/2021 | Wang | G06K 9/6267 |
| 2021/0374553 | A1* | 12/2021 | Li | G06V 10/774 |
| 2021/0397895 | A1* | 12/2021 | Sun | G06K 9/623 |
| 2022/0067940 | A1* | 3/2022 | Heng | G06N 3/0454 |

OTHER PUBLICATIONS

Dgani, et al., "Training a Neural Network Based on Unreliable Human Annotation of Medical Images," 2018 IEEE 15th International Symposium on Biomedical Imaging Washington, DC, pp. 39-42 (2018).

(Continued)

*Primary Examiner* — Sean T Motsinger
(74) *Attorney, Agent, or Firm* — Kilpatrick Townsend & Stockton LLP

(57) ABSTRACT

To improve the performance and accuracy of an image segmentation neural network, a cascaded robust learning framework for the segmentation of noisy labeled images includes two stages: a sample selection stage, and a joint optimization stage with label correction. In the first stage, the clean annotated samples are selected for network updating, so that the influence of noisy sample can be interactively eliminated. In the second stage, the label correction module works together with the joint optimization scheme to revise the imperfect labels. Thus, the training of the whole network is supervised by the corrected labels and the original ones.

20 Claims, 10 Drawing Sheets

(56) References Cited

OTHER PUBLICATIONS

Min, et al., "A Robust Deep Attention Network to Noisy Labels in Semi-supervised Biomedical Segmentation." Computer Science, ArXiv, pp. 4321-4329 (2018).
Patrini, et al., "Making Deep Neural Networks Robust to Label Noise: a Loss Correction Approach," Computer Vision Foundation, pp. 1944-1952 (2017).
Ren, et al., "Learning to Reweight Examples for Robust Deep Learning," Computer Science, ArXiv, 13 pages (2019).
Wang, et al., "Comprehensive analysis of lung cancer pathology images to discover tumor shape and boundary features that predict survival outcome," Scientific Reports, vol. 8, article 10393, 9 pages (2018).

* cited by examiner

ROBUST MACHINE LEARNING FOR IMPERFECT LABELED IMAGE SEGMENTATION

BACKGROUND

Artificial neural networks have enabled computing devices to perform complex human tasks such as visual perception. Visual perception using neural networks may include image classification and image segmentation. Image classification refers to recognizing the presence of an object in an image (e.g., recognizing an image as depicting a cat, etc.), whereas image segmentation refers to identifying the outline and shape of different objects in an image (e.g., separating a cat from the background of an image, separating eyes from the nose of a face, etc.). The output of the image segmentation process (e.g., shapes and outlines of objects identified in an image) can be referred to as segmentation masks. Image segmentation can be useful in many applications such as navigating an autonomous vehicle and facial recognition. Image segmentation can be especially useful in medical imaging, where subtleties in medical images can be complex and sometimes even challenging for experienced physicians.

BRIEF SUMMARY

To improve the performance and accuracy of an image segmentation neural network, a cascaded robust learning framework for the segmentation of noisy labeled images includes two stages: a sample selection stage, and a joint optimization stage with label correction. In the first stage, the clean annotated samples are selected for network updating, so that the influence of noisy sample can be interactively eliminated. In the second stage, the label correction module works together with the joint optimization scheme to revise the imperfect labels. Thus, the training of the whole network is supervised by the corrected labels and the original ones. Compared with other state-of-the-art models, the cascaded learning framework keeps high robustness when the training data contains various noisy labels. Experimental results on the benchmark dataset demonstrate that the technique outperforms other methods on segmentation tasks and achieves improved results on the noisy-labels dataset.

In some implementations, a process for performing the cascaded learning technique can include receiving a set of image samples and original labels for the image samples to train an image segmentation neural network model. A sample selection process using multiple neural networks can be performed to select a subset of image samples from the set of image samples. For example, the system may use three neural networks to perform the sample selection process. The image segmentation neural network model can then be trained using the selected subset of image samples. This initial training can be performed for a predetermined number of epochs. A label correction process can then be performed to generate corrected labels for the remaining image samples, and the image segmentation neural network model can continued to be trained using a combination of the corrected labels and the original labels in a joint optimization process.

DETAILED DESCRIPTION

Figure 1:
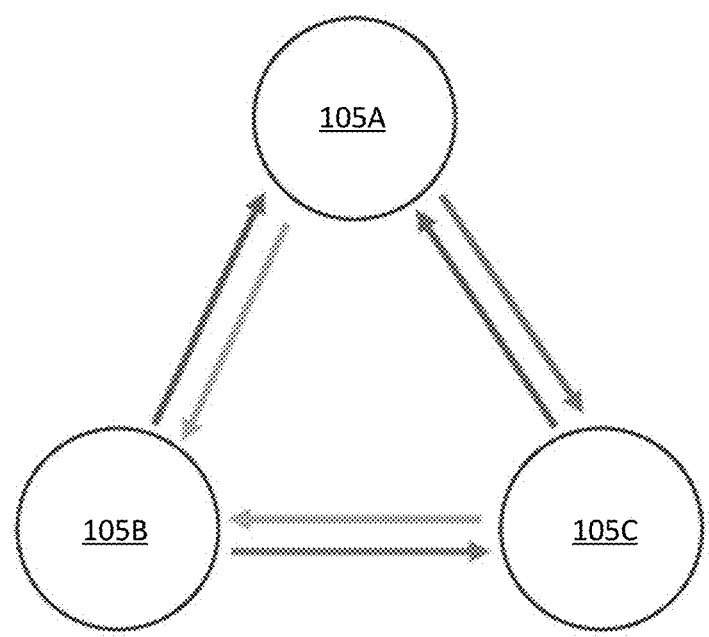
FIG. 1 illustrates a conceptual block diagram of the learning framework system for the sample selection stage.

An artificial neural network may contain a number of interconnected neural network layers that are each associated with a set of weight values. These neural network layers include an input layer that receives the initial input data, an output layer that produces a prediction result from the input data, and any number of hidden layers which are intermediate computational layers between the input and output layers. A deep neural network may refer to a neural network with multiple hidden layers.

During operation of a neural network, the initial input layer (e.g., the first layer) can receive an input data set, combine the input data set with weight values (e.g., by multiplying the input data set with the weights and then summing the products) to generate a first output data set for the first layer, and propagate the first output data set to the second neural network layer in a forward propagation operation. The second neural network layer receiving the first output data set from the first layer performs another set of forward propagation operations on the first output data set to generate a second output data set, and propagates the second output data set to the next neural network layer, and so on.

The forward propagation operations can start at the initial input neural network layer and end at the output neural network layer. The forward propagation operations at each neural network layer can represent different stages of extraction and processing of information from the input data set. A decision can then be made based on the output data of the output neural network layer. For example, each neural network layer can extract and/or process features from an image, and a prediction of the shape and location of objects in the image can be derived based on the result of processing the extracted features at the neural network layers.

The set of weigh values used in a neural network can be generated and/or updated by a training process to improve the likelihood of the neural network outputting a correct prediction or decision. An example training process can use a gradient descent scheme. As part of the training process, forward propagation operations can be performed on a training input data set using the set of weights at each neural network layer to generate a training output data set at the output layer. The training output data set can be compared with a reference output data set (e.g., the expected results or the ground truth of what the outcome should be) to determine the error of the neural network model operating on the training input data, and this error can be used to adjust the weight values of the model to improve the accuracy of the neural network.

As part of the training process, each neural network layer can perform backward propagation operations to adjust the set of weight values at each neural network layer. During backward propagation, the error or the difference between the training output data set and the reference output data set is propagated backward from the output layer back towards the input layer. At each layer, a set of weight gradients is calculated based on the error to determine the amount of adjustment to make to each weight value. One iteration of the training process or an epoch is complete when the weight values of each layer have been adjusted for the full training input data set. The next iteration of the training process can then be performed with the updated weights, and the training process can be repeated for a number of epochs until a loss objective is achieved, such as minimizing the error or until the error lowers to a certain threshold.

Deep neural networks (DNNs) have achieved human-level performance on many medical image analysis tasks, such as melanoma diagnosis, pulmonary nodules detection, retinal disease, and lumpy node metastases detection. These outstanding performances heavily rely on massive training data with high-quality annotations to use as a reference output data set during supervised learning. Annotation of medical images, especially for pixel-level annotation for segmentation tasks, can be costly and time-consuming. The results of the annotation process can be highly dependent on the experience level of the clinical experts performing the annotations, and annotations on the same image from different clinical experts may have discrepancies that are usually inevitable, for example, around the blurred boundaries of lesions and organs. The variations and discrepancies on the image annotations can be referred to as noisy labels on the image data.

DNNs trained by noisy labeled datasets can cause performance degradation. That is because the huge memory capacity and strong learning ability of DNNs can remember the noisy labels and easily overfit to them. Tackling the issue of annotation noises can be complicated and challenging. Manually reducing the presence of incorrect labels, for example by requiring a stronger committee of expert clinicians to come to consensus on labelling, is expensive, time-consuming and impractical. Approaches to address the issue of the noisy labels in the context of neural networks may include adding an additional softmax neural network layer to estimate the correct labels, considering the noisy sample and hard sample by an on-line sample selection module and re-weighting module, using an automatic quality evaluation module and overfitting control module to update the neural network parameters, using a local visual cues neural network (LVC-Net) losses function by combining noisy labels with image local visual cues to generate better semantic segmentation, etc. Most of the approaches adopt the strategy of selecting samples for training and exhibit their feasibility in robust learning. However, these methods yield a strong accumulated error caused by sample selection bias. Wrongly selected samples will influence the network performance and further decrease the quality of selected samples. The sample selection bias issue can be addressed by utilizing a small set of clean training samples to assign weights to training samples. The main drawback of this approach is that the extra clean labels are usually unavailable in the real-world scenarios.

To tackle the challenging problem of noisy labeled segmentation masks, a cascaded learning framework that can be used with images having imperfectly annotated ground truth is disclose. Experimental results of applying the framework to lung segmentation using X-ray images are also presented herein to illustrate the effectiveness of the technique. In the first stage, the framework selects relatively clean annotated samples according to the prediction confidence and uncertainty of samples, which is inspired by co-teaching techniques. The model can include three independent networks being trained simultaneously, where each network is real-time updated according to the prediction results of the other two networks. For a relatively clean annotated sample, the three networks tend to produce high confidence prediction with smaller inter-rater variance. Thus, the samples with close prediction and high confidence are selected as the high-quality or relatively clean sample, which will be used to contribute to the weight backpropagation process.

Since the selection stage leads to a low utilization efficiency of the valuable training data, a label correction module in the second stage is used to correct the imperfect labels. Furthermore, a joint optimization scheme is designed to cooperatively supervise the three networks with the original label and the corrected one. The technique was extensively evaluated on a chest x-ray dataset. The results demonstrate an improvement in training the system with noisy labels, and that the cascaded robust learning framework can more accurately perform the lung segmentation as compared other methods.

FIG. 1 illustrates a conceptual block diagram of the training framework system 100 for the sample selection stage. System 100 may utilize multiple neural networks. For example, system 100 can include three neural networks 105A, 105B, and 105C. Each of the neural networks may include a convolution neural network (CNN). In some implementations, each of the neural networks 105A, 105B, and 105C can be implemented using a U-net neural network. In the sample selection stage, neural networks 105A, 105B, and 105C may train independently in forward propagation, but the weight values of each neural network are updated during backward propagation according to the predictions of the other peer neural networks.

The training data set may include images x and noisy labeled ground truth $\hat{y}$ while the clean ground truth y is unknown. The goal for this fully supervised segmentation task is to minimize the following object function:

$$\min_{\theta} \sum_{i=1}^{N} \mathcal{L}(f(x_i; \theta), \hat{y}_i)$$

where $\mathcal{L}$ denotes the loss function (e.g., cross-entropy loss) to evaluate the quality of the network output on inputs. $f(\theta)$ denotes the segmentation neural network with weights $\theta$.

Updating the network with high confidence samples can improve the robustness to noisy labels. Therefore, the sample selection framework (SS) is configured to select high confidence samples as the useful training instances. As shown in FIG. 1, the training framework system can utilize three independent neural networks 105A, 105B, and 105C, where they have identical architecture (e.g., each neural network can be implemented as a U-net neural network). The initial weight values of the three independent neural networks 105A, 105B, and 105C can be randomly initialized. In the initial phase of the training process, high confidence samples with small uncertainty are selected to update each network, because those samples are more likely to be relatively clean labeled instances. For the experimental results presented herein, half batch data was selected empirically as useful information. Concretely, the three neural networks feed forward and predict on the same mini-batch of data. Then for each network, the useful samples for weight updating are obtained by the other two neural networks as shown in FIG. 1.

Taking neural network 105A as an example, the useful sample for network A is obtained from neural network 105B and neural network 105C, where the high uncertainty samples showing disagreed predictions between neural networks 105B and 105C are excluded, and then among the low uncertainty samples, the small loss samples are further selected as useful samples for neural network 105A. Note that the three networks have different training parameters as they are updated by different selected samples in each mini-batch. The prediction uncertainty μ of each sample between two neural networks (e.g., neural networks 105B and 105C) can be calculated as $$\mu = |\mathcal{L}_{(f_B(x_i;\theta_B),\hat{y}_i)} - \mathcal{L}_{(f_C(x_i;\theta_C),\hat{y}_i)}|$$

where $\mathcal{L}$ denotes the cross-entropy loss. $f_B$ and $f_C$ denote neural network 105B and neural network 105C, respectively. $\theta_B$ and $\theta_C$ represent the weights of neural network 105B and neural network 105C, respectively. Image samples having a small prediction uncertainty between neural networks 105B and 105C can be selected as samples to use for updating the weight values of neural network 105A during backward propagation. For example, the image samples can be sorted and ranked according to the prediction uncertainty and training loss, and half batch of samples with the smallest uncertainty and training loss can be selected for this initial phase of training. Similarly, the images samples selected for neural network 105B can be selected based on the uncertainty between neural networks 105A and 105C, and the images samples selected for neural network 105C can be selected based on the uncertainty between neural networks 105A and 105B. In other implementations, the number or percentage of image samples being selected for this initial phase of training can be varied.

In the stage of sample selection, only a subset of samples may be used for training. As such, the sample selection stage does not take full advantage of the entire set of training data. A joint optimization (JO) framework can be employed to train the network with the original label and corrected label of the remaining training data containing the imperfect labels, so that the utilization efficiency of the training data can be maintained. In order to correct noisy labels, a label correction module can work together with the joint optimization scheme to provide the corrected labels.

Figure 2:
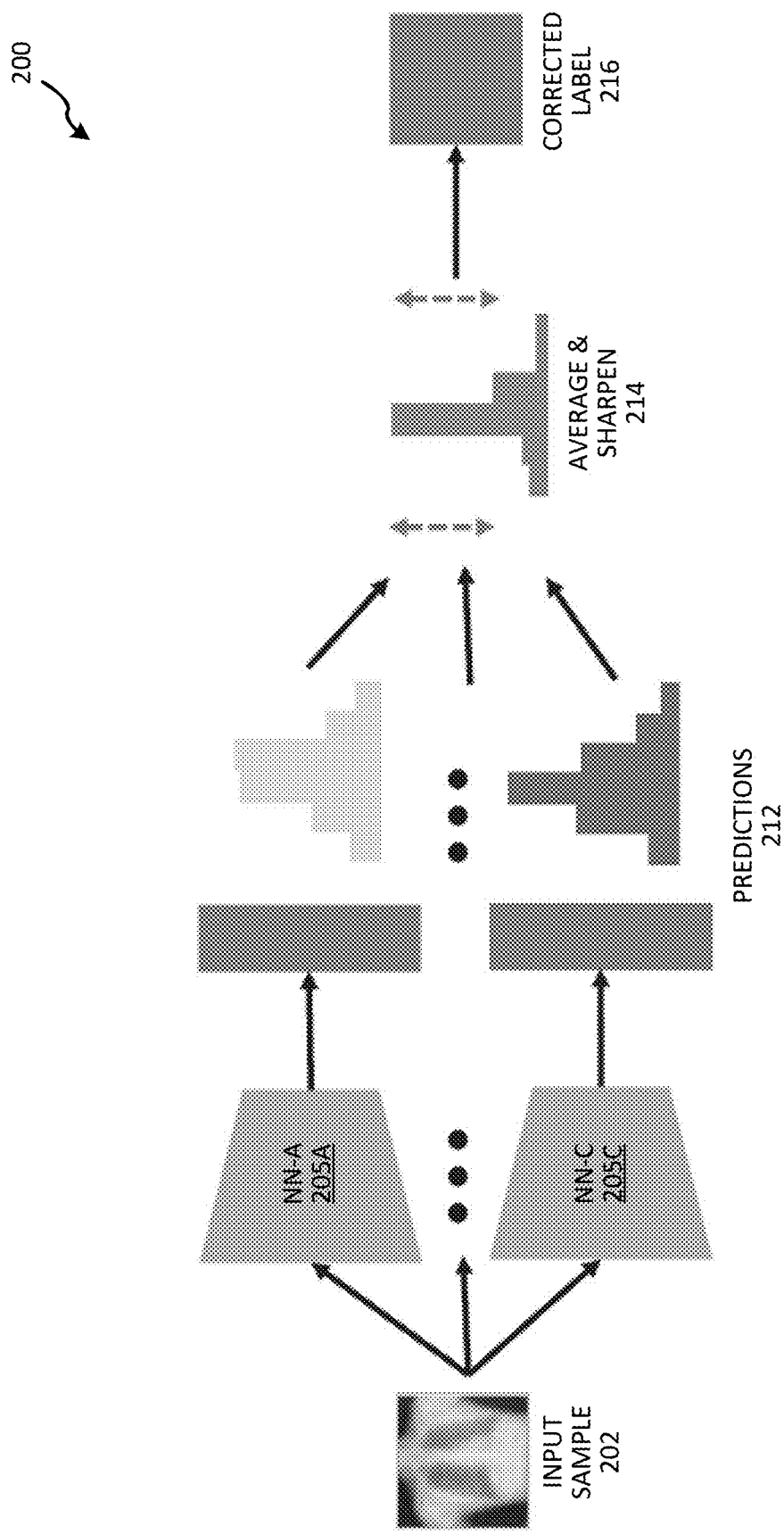
FIG. 2 illustrates a conceptual block diagram of the label correction process.

The sample selection stage first trains an initial neural network system by using image x and noisy label ŷ. Subsequent to the sample selection stage, the system can proceed to the label correction phase as shown in FIG. 2. During the label correction process 200, an image sample 202 is inputted into the partially trained neural networks 205A-C to generate respective prediction results 212. The prediction results 212 then subjected to an average and sharpen operation 214 to generate the corrected label 216 for the input image sample 202.

In the label correction phase, the predictions from the multiple neural networks are averaged in each iteration, and an entropy minimization step similar to those used in semi-supervised learning is subsequently performed. More specifically, for the average prediction of the neural networks, a sharpening function is applied to reduce the entropy of the per pixel label distribution through adjusting the temperature hyperparameter of the neural network as follows:

$$q = \frac{1}{3}(f_A((x_i;\theta_A),\hat{y}_i) + f_B((x_i;\theta_B),\hat{y}_i) + f_C((x_i;\theta_C),\hat{y}_i))$$

$$\text{sharpen}(q, T)_i = q_i^{\frac{1}{T}} / \sum_{j=1}^{L} q_j^{\frac{1}{T}}$$

where q is the average prediction feature map over two models, and T is a hyperparameter that adjusts the temperature. As T approaches zero, the output of sharpen(q, T) will approach a one-hot distribution. With q=sharpen(q, T) being used as a corrected target for the model's prediction later, the setting of T=0.5 is chosen to encourage the model to produce lower entropy prediction.

Figure 3:
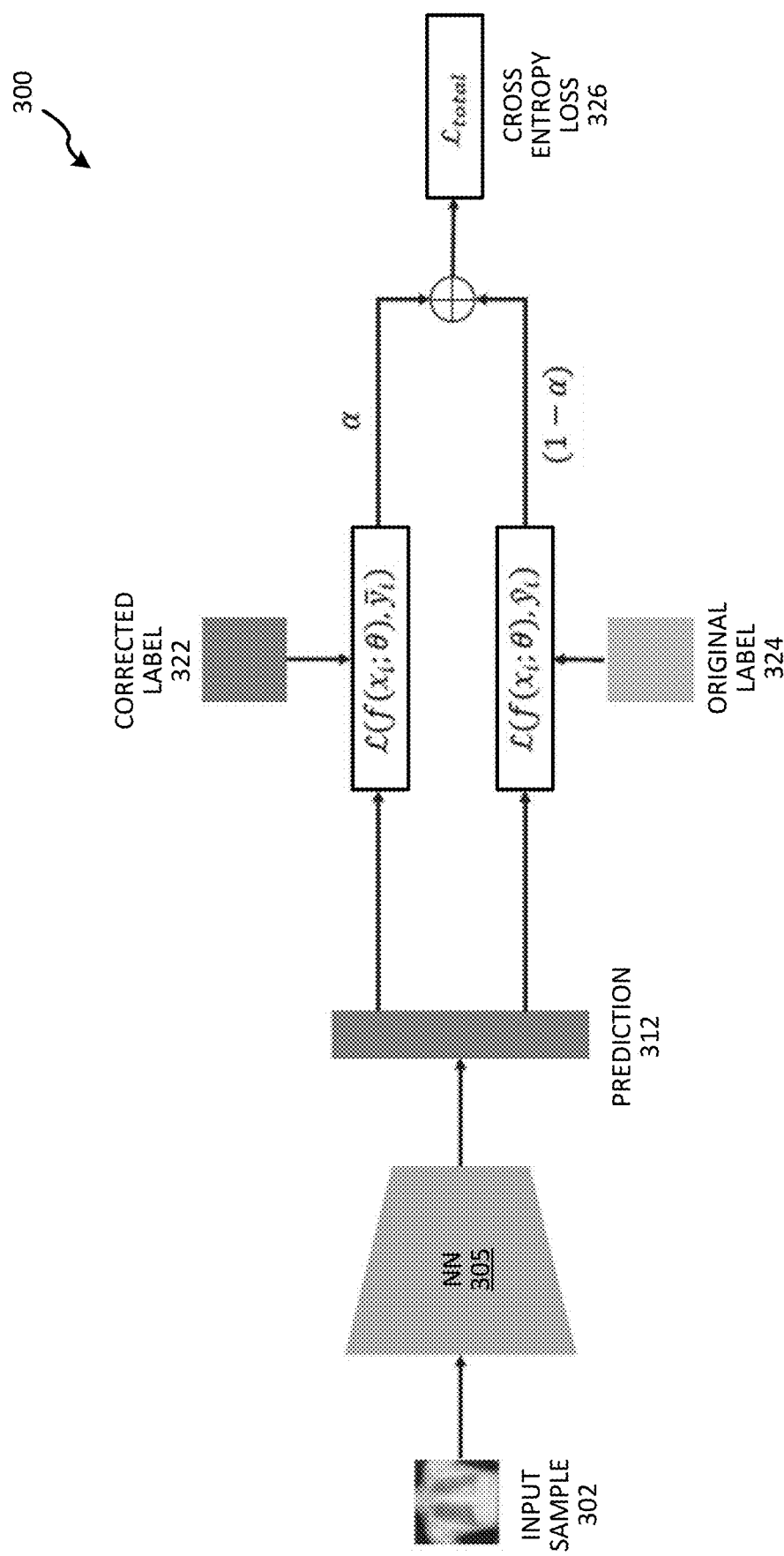
FIG. 3 illustrates a conceptual block diagram of the joint optimization process.

FIG. 3 illustrates the conceptual diagram of the joint optimization process 300. The joint optimization stage can be started after performing the sample selection for a predetermined number of epochs (e.g., 20, 50, or 80 epochs). During the joint optimization process 300, an image sample 302 is inputted into the neural network model 305 to generate a prediction result 312. The prediction result 312 is compared with the corrected label 322, and the loss function associated with the corrected label 322 is weighted with a value of α being between 0 and 1. The prediction result 312 is also compared with the original label 324, and the loss function associated with the original label 324 is weighted with a value of (1−α). The two weighted loss functions are summed to derive the cross entropy loss function 326. Each of the multiple neural networks used in the sample selection process (e.g., each of neural networks 105A, 105B, and 105C) can perform the joint optimization process 300 and update their respective weight values independently from the other neural networks. When all image samples have been processed, the final weight values from the three neural networks at the completion of training can be averaged to generate the weight values for the resulting image segmentation neural network model.

For each uncertain sample, a corrected label for the imperfect input is produced by a label correction module. The corrected label is used in the training process together with the original label as a complementary supervision to jointly supervise the network:

$$\mathcal{L}_{total} = \alpha \times \mathcal{L}_{(f(x_i;\theta)\hat{y}_i)} + (1-\alpha) \times \mathcal{L}_{(f(x_i;\theta)\bar{y}_i)}$$

where $\mathcal{L}$ is the cross entropy loss, ŷ is the original noisy label, and ȳ is the corrected label produced by the label correction phase. The weight factor α controls the relative importance of the two terms as described above. The experimental data presented herein sets α=0.5.

To evaluate the effectiveness of the training technique described above, the technique was used to train an image segmentation neural network model with chest x-ray images. The dataset includes 566 chest x-ray images, and each image has the left and the right lungs. Segmentation masks were prepared manually for the images. The 566 chest x-ray images were split into 396 images for training and 170 for evaluation. All the images were resized to 256×256, and normalized as zero mean and unit variance.

The framework system was implemented in PyTorch, using a TITAN Xp GPU. The Stochastic Gradient Descent optimizer was used to update the network parameters with weight decay of 0.001 and a momentum of 0.9. An exponential learning rate was adopted with an initial learning rate set as 0.001. Training was performed over a total duration of 100 epochs using a batch size of 32. Data augmentation included random rotation and random horizontal flipping. In order to produce noisy labels for the training data, different noise ratio and noise level were applied to the dataset. Noise ratios of 25%, 50%, or 75% were selected to erode or dilate samples from the training set with the number of iterations (noise level) n between 5 to 15 (5≤n≤15). The dice coefficient, which measures the amount of pixel overlap between the ground truth and the prediction results, was used as an evaluation criteria for segmentation accuracy evaluation.

Figure 4:
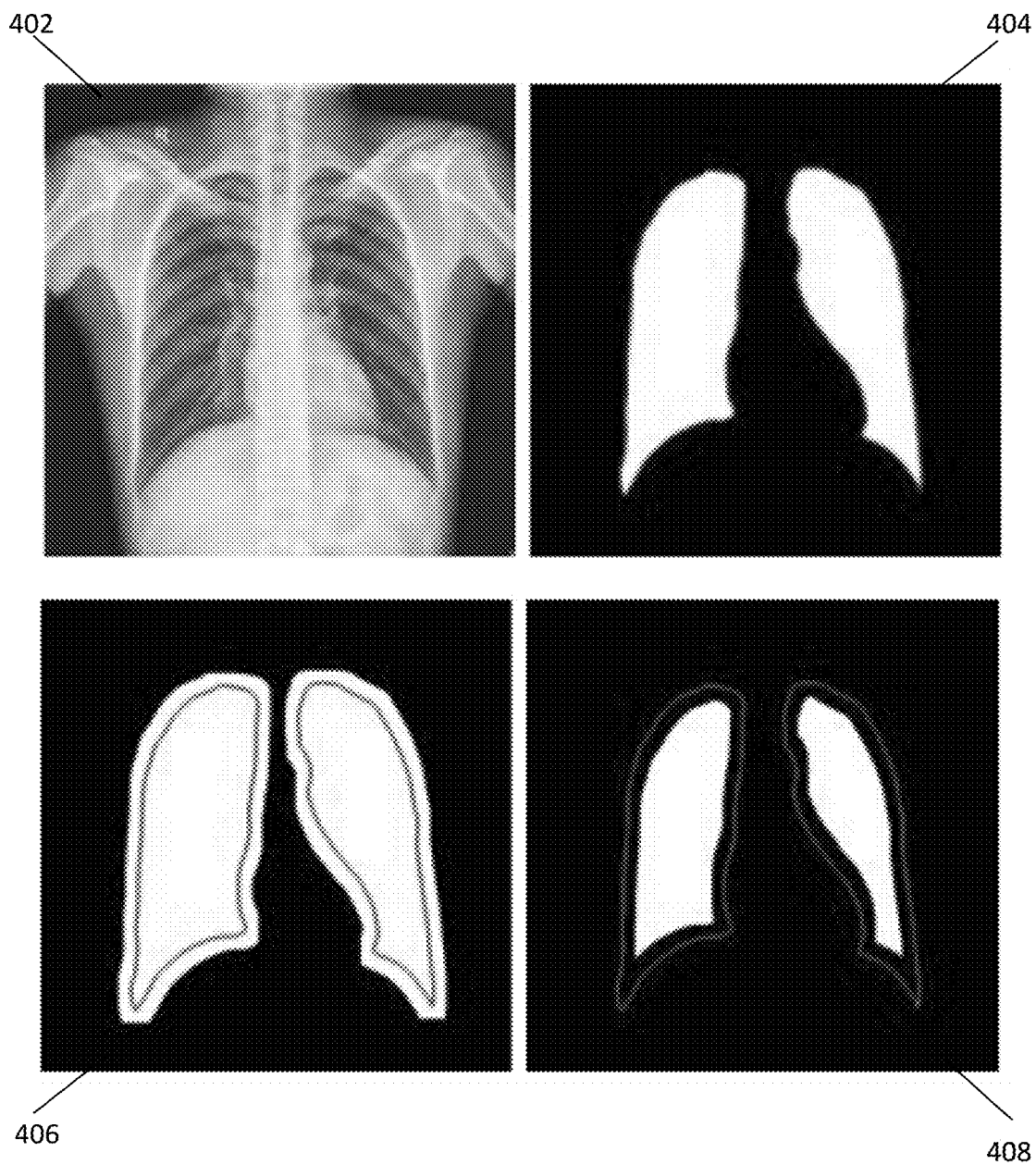
FIG. 4 illustrates an example of noisy labels annotated on a medical image.

FIG. 4 illustrates an example of noisy annotation for the segmentation mask of a chest x-ray image. Image 402 is an example of an original chest x-ray medical image in the training dataset. Image 404 is the ground truth of the image segmentation result of the original image 402. Images 406 shows the image segmentation with a dilation from the ground truth. Image 408 shows the image segmentation with an erosion from the ground truth. The annotation in images 406 and 408 are considered noisy because they deviate from the ground truth 404.

Figure 5:
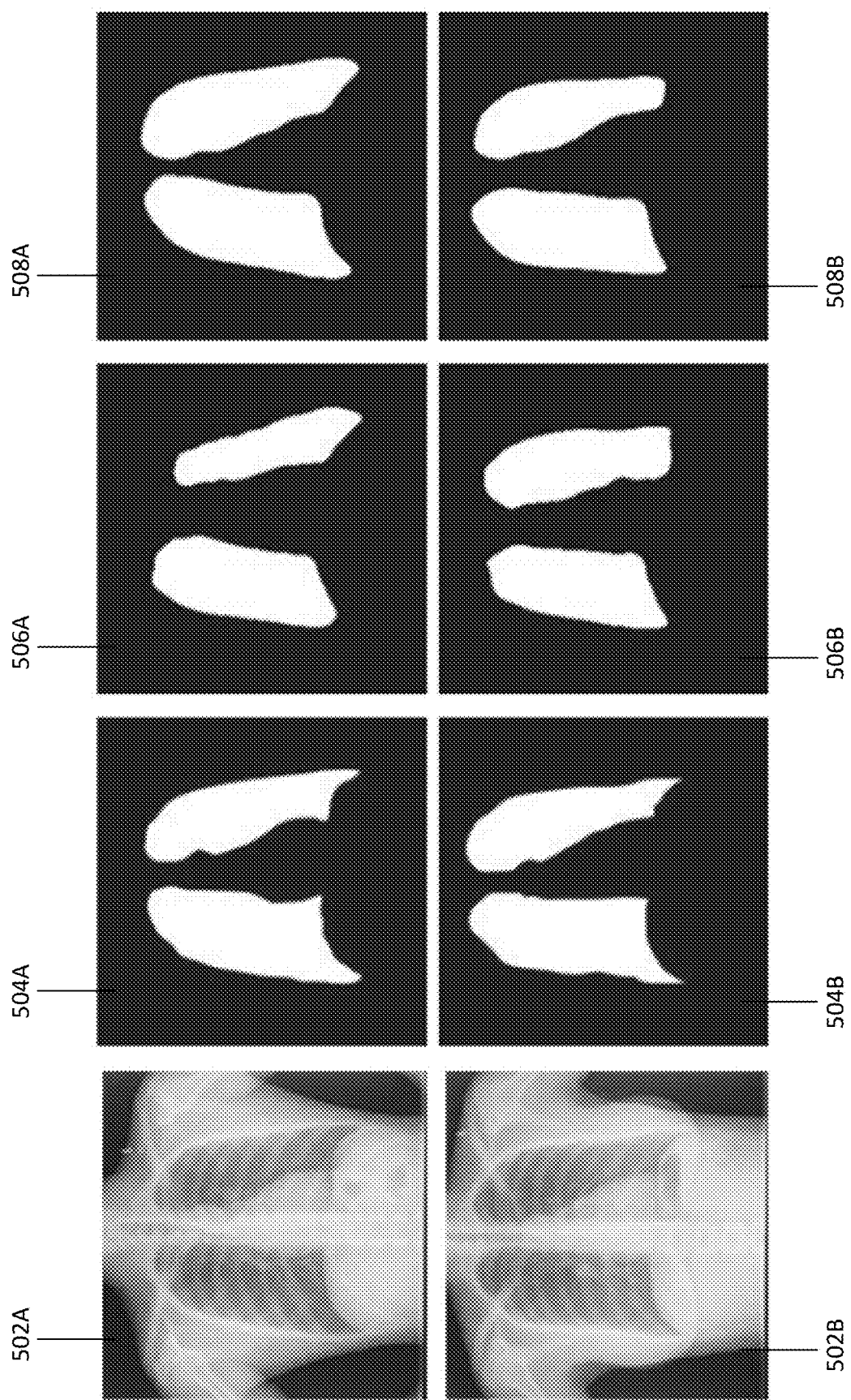
FIG. 5 illustrates examples of image segmentation results using the cascaded learning framework as compared to a baseline U-Net system.

The experiments were conducted on the chest x-ray dataset described above. The image segmentation neural network model was trained on samples with different levels of noisy labels, and the model was tested by the clean labels. FIG. 5 illustrates the image segmentation results of a neural network model employing the cascaded learning framework as compared to a baseline conventional U-Net neural network. Images 502A and 502B are two examples of the original input chest x-ray image samples. Images 504A and 504B are the ground truth of the image segmentation of the original images 502A and 502B, respectively. Images 506A and 506B are the image segmentation results of using a conventional U-Net neural network model with a 75% noise ratio applied to original images 502A and 502B, respectively. Images 508A and 508B are the image segmentation results of a neural network trained by the cascaded learning framework with a 75% noise ratio applied to original images 502A and 502B, respectively. As can be seen, the cascaded learning framework produces results that are more accurate and closer to the ground truth than using a conventional U-Net model.

Table 1 presents the image segmentation performances of a baseline U-Net neural network model, a co-teaching technique, the learning framework disclosed herein with only the sample selection stage, and the cascaded robust learning framework disclosed herein with both sample selection and joint-optimization with label correction. All systems were trained by noisy labels. The baseline U-Net was first trained with full supervision and the noisy level set to zero, which can be regarded as the upper-line performance. Compared with the baseline U-Net, the cascaded learning framework improves the segmentation performance and achieves an average dice of 0.925 on the clean annotated dataset, indicating that the sample selection stage and joint-optimization stage can encourage the model to learn more distinguishing features.

TABLE 1

Comparison of prediction results

| Noise ratio | Noise level | Strategy | Dice (%) | k 20 | k 50 | k 80 |
|---|---|---|---|---|---|---|
| No noise | — | Basic U-Net | 89.89 | — | — | — |
| No noise | — | Co-teaching | 91.46 | — | — | — |
| No noise | — | Entire Framework | — | 92.52 | 92.50 | 92.36 |
| 25% | 5 > n > 15 | Basic U-Net | 87.58 | — | — | — |
| 25% | 5 > n > 15 | Co-teaching | 89.06 | — | — | — |
| 25% | 5 > n > 15 | Sample selection | 91.42 | — | — | — |
| 25% | 5 > n > 15 | Entire framework | — | 92.11 | 92.81 | 93.06 |
| 50% | 5 > n > 15 | Basic U-Net | 86.65 | — | — | — |
| 50% | 5 > n > 15 | Co-teaching | 88.56 | — | — | — |
| 50% | 5 > n > 15 | Sample selection | 88.87 | — | — | — |
| 50% | 5 > n > 15 | Entire framework | — | 90.14 | 90.05 | 89.56 |
| 75% | 5 > n > 15 | Basic U-Net | 84.96 | — | — | — |
| 75% | 5 > n > 15 | Co-teaching | 90.23 | — | — | — |
| 75% | 5 > n > 15 | Sample selection | 90.41 | — | — | — |
| 75% | 5 > n > 15 | Entire framework | — | 91.07 | 91.19 | 91.17 |

For the training dataset with different levels of noisy labels, the segmentation performance of the baseline U-Net decreases dramatically as the noise level increases. Compared with baseline U-Net, the sample selection stage (SS) can consistently improve the performance by encouraging the model to be trained by the selected data. Through the joint optimization (JO) stage supervised by the corrected label and original label, the segmentation accuracy is further improved, indicating that the cascaded learning technique can effectively eliminate the effect of the noise and gain performance by producing the correct label. At all the noise level, the cascaded learning framework is compared with the state-of-the-art noise robust co-teaching method, which selects the small loss samples according to the prediction of peer network. The results show that the cascaded learning framework outperforms the state-of-the-art method in all the noise level settings.

The impact of the joint optimization starting epoch k on the performance of the cascaded learning framework was also examined. As shown in Table 1, the joint optimization (JO) with label correction stage is started at 20, 50, and 80 epochs, respectively. The experimental results show that the joint optimization stage can consistently produce good results with different starting epoch k.

Figure 6:
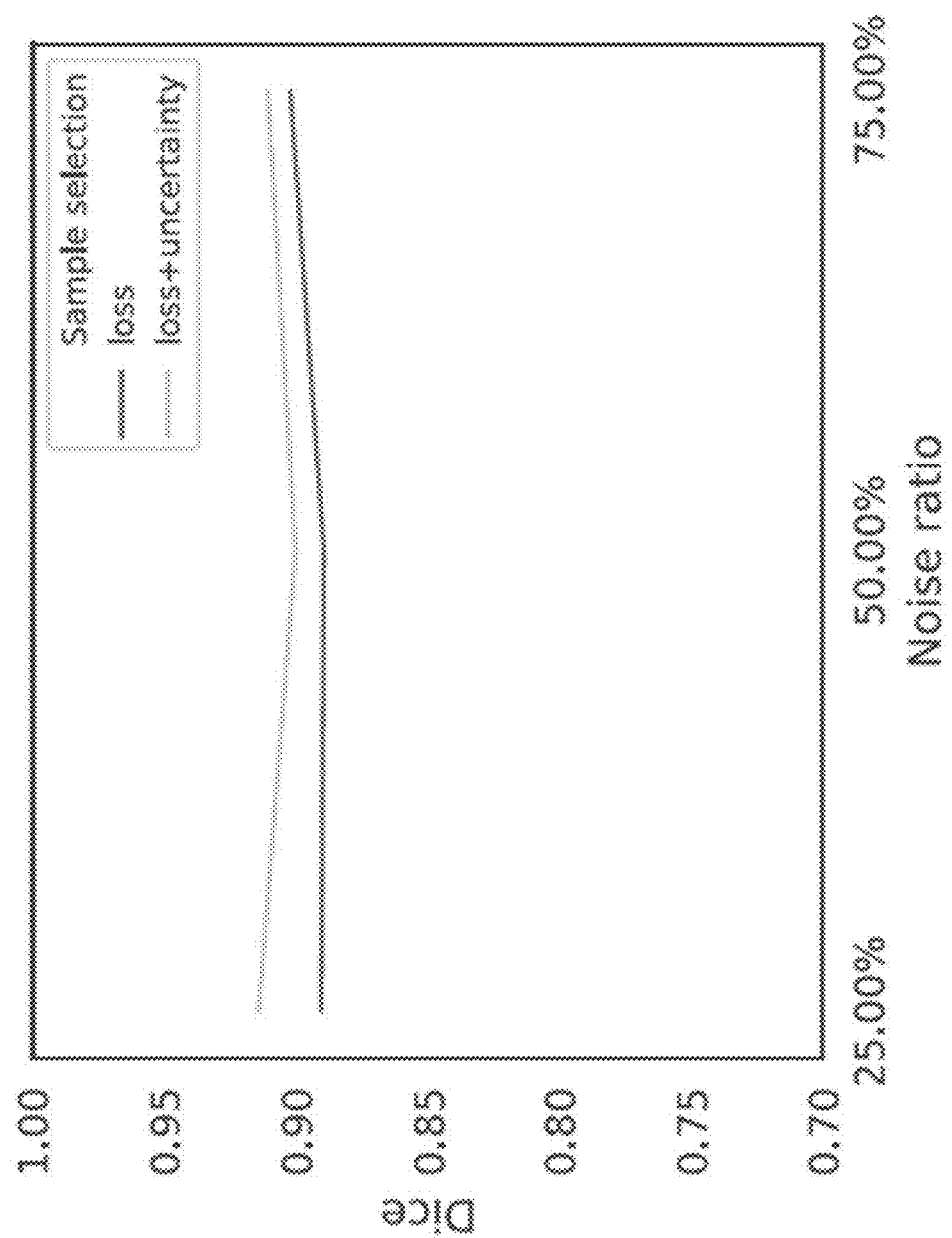
FIG. 6 illustrates the segmentation accuracy different sample selection criteria.
Figure 7:
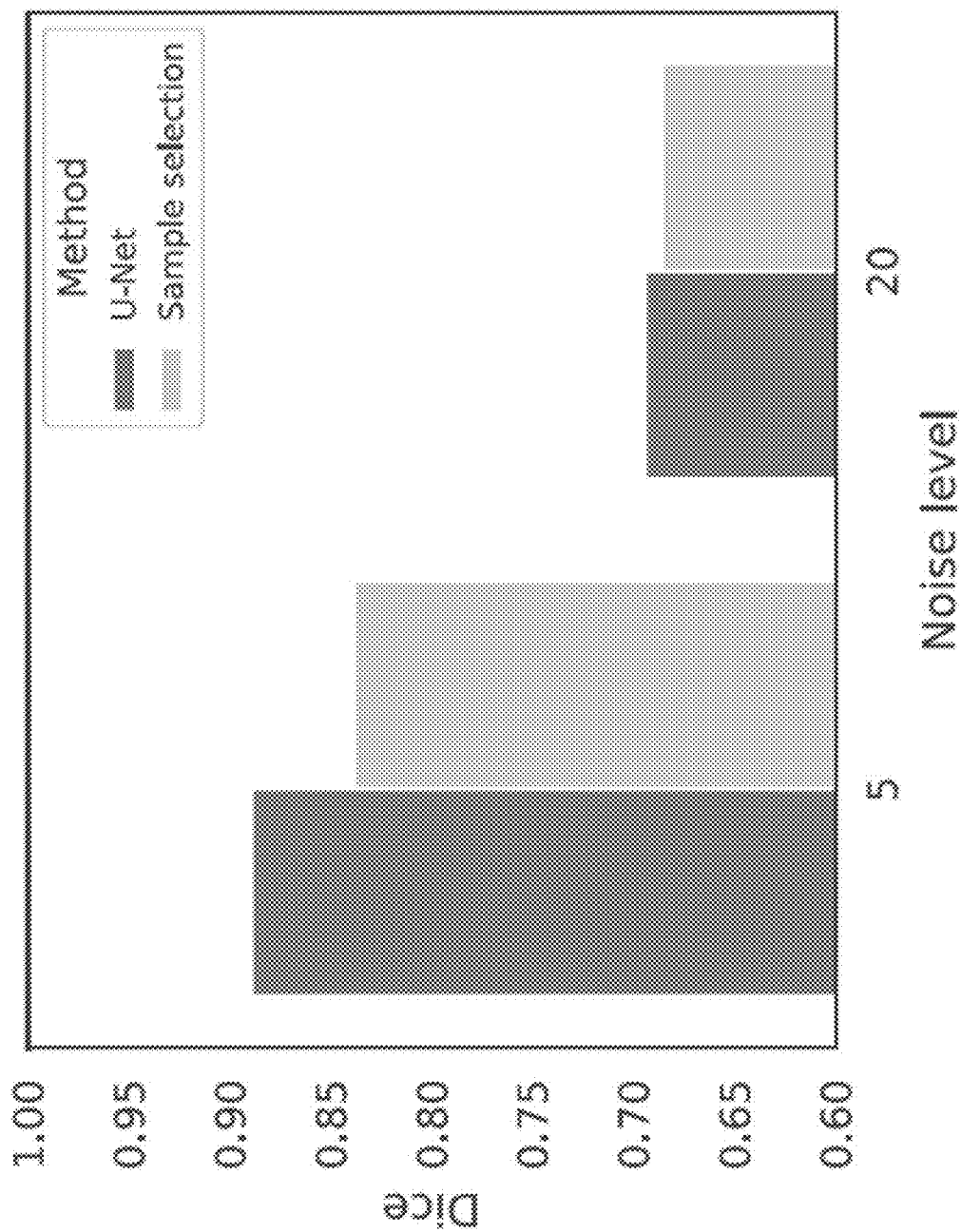
FIG. 7 illustrates the segmentation accuracy of U-Net compared with the sample selection stage on 100% noise setting.

Compared with the baseline U-Net, the sample selection stage (SS) shows higher segmentation accuracy under different noisy level, as shown in Table 1. To validate the criteria of the sample selection, another experiment was conducted by only selecting the small loss sample. FIG. 6 shows the test accuracy with different sample selection criteria. As shown in FIG. 6, the test accuracy significantly improved when considering the uncertainty in the selection stage. To further validate the effectiveness of the learning framework at the sample selection stage, the technique was applied to the training dataset with 100% noise and noise level n=5 and 20. As shown in FIG. 7, under this setting, the sample selection stage shows worse segmentation accuracy than the baseline U-Net, because no clean sample can be selected. The results decreased due to the low sample utilization efficiency.

Figure 8:
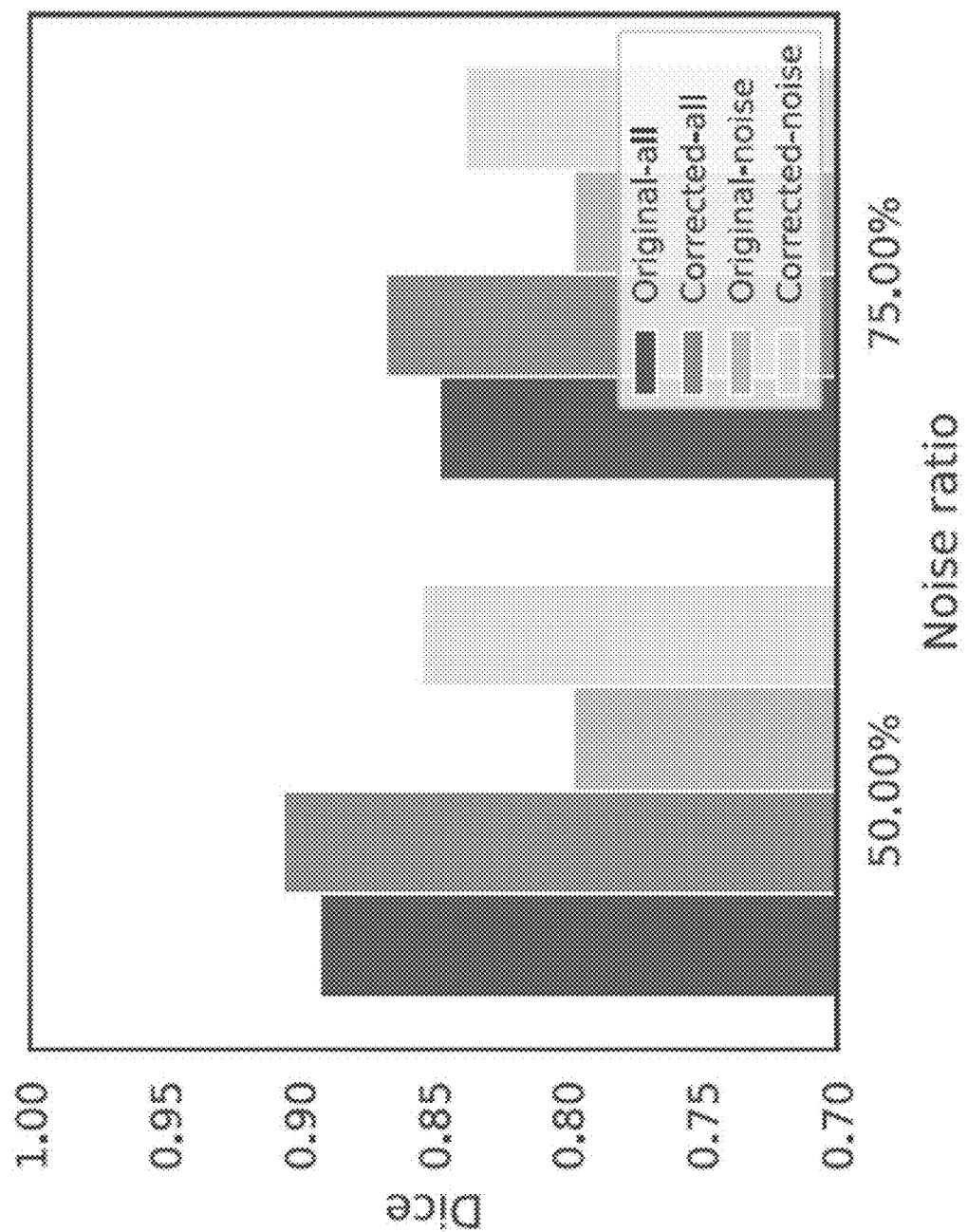
FIG. 8 illustrates the label accuracy of labels in the original data set, and labels corrected by the model at the end of training.

To analyze the contribution of the joint optimization stage, the label accuracy with and without the stage of joint optimization and label correction were determined. The Dice coefficient of the initial noisy label ($\hat{y}$) and the corrected label ($\bar{y}$) of the final model at the end of the training were calculated. FIG. 8 shows the overall accuracy for severe noise situation (50%, 75%), where the Dice coefficient for all the original (Original-all) and corrected label (Corrected-all), and the Dice coefficient only for the original noise label (Original-noise) and corrected noise label (Corrected-noise). As shown in FIG. 8, the label quality is improved by the scheme of joint optimization and label correction, especially for those original noise labels.

Figure 9:
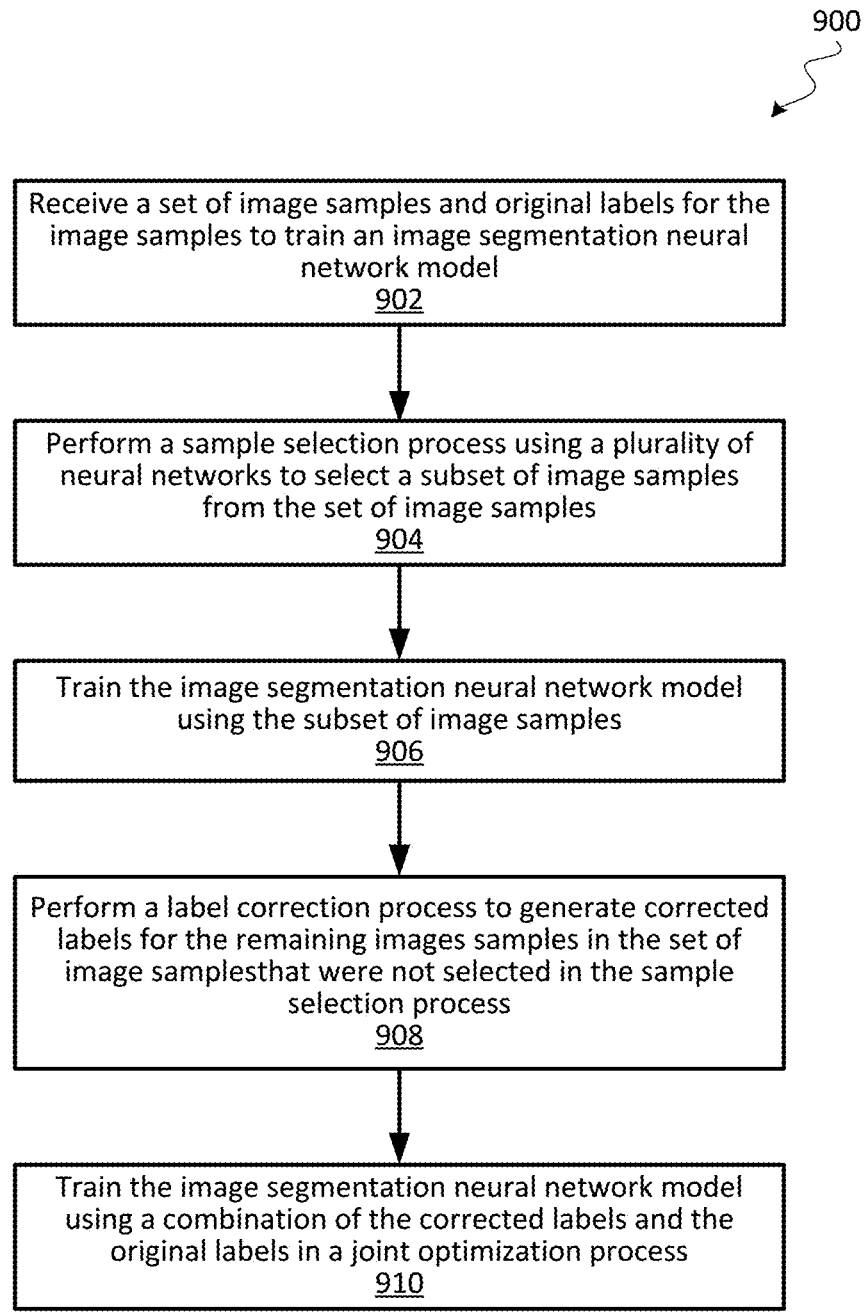
FIG. 9 illustrates a flow diagram of an example of a cascaded learning process.

FIG. 9 illustrates a flow diagram of a process 900 for performing a cascaded learning technique, according to some implementations. Process 900 can be performed by a computing system suitable for training neural networks. The computing system may include one or more computing devices such as computers, servers, or the like, and the technique can be executed by one or more general processors, one or more accelerators such as graphic processing units, neural network processors, etc., or a combination thereof. The computing system can implement multiple neural networks to facilitate training (e.g., three neural networks). In some implementations, each of the multiple neural networks can have an identical architecture. For example, each neural network can be implemented as a U-Net neural network.

Process 900 may begin at block 902 by receiving a set of image samples and original labels for the image samples to train an image segmentation neural network model. The original labels can be annotated manually, and provides noisy ground truth or estimation of what the image segmentation results should be. In some implementations, the image samples can be medial images such as chest x-ray images labelled by expert clinicians.

At block 904, a sample selection process can be performed using multiple neural networks to select a subset of image samples from the set of image samples. The sample selection process may select an image sample for inclusion in the subset of image samples based on a prediction uncertainty on the image sample between two of the neural networks. In other words, to select image samples with a high confidence of having a relatively clean label, the sample selection process compares the prediction results on that image from two neural networks. If the prediction results from two neural networks are close enough to each other, the label can be assumed to be relatively clean and such an image sample can be selected for use in the first phase of training. In some implementations, the images samples can be sorted and ranked according to the prediction uncertainty, and a predetermined number or predetermined percentage of the image samples having the smallest prediction uncertainty can be selected. In some implementations, image samples with a prediction uncertainly below a certain threshold can be selected.

At block 906, the subset of image samples selected in block 904 is used to train the image segmentation neural network model. During this phase of training, the model of one neural network is updated by the image samples selected by the prediction results of the other neural networks. For example, in a three neural network system having networks A, B, and C, suppose an image sample is selected as a high confidence sample by comparing the prediction results performed on that image sample from network B and network C. The weight gradients that are used to update the weight values during backward propagation as calculated by networks B and C can be averaged, and the averaged weight gradients can be used to update the weight values of network A. Each of the multiple neural networks can be trained in a similar manner, and training with the selected subset of images samples can be performed for a predetermined number of epochs (e.g., 20, 50, or 80 epochs) before transitioning to the joint optimization phase.

At block 908, a label correction process is performed to generate corrected labels for the remaining image samples in the set of image samples that were not selected in the sample selection process of block 904. The label correction process is performed in preparation for the joint optimization training. During the label correction process, each of the multiple neural networks performs prediction on an image sample with noisy labels. The prediction results from the neural networks are averaged, and a sharpening function is applied to reduce entropy of the per pixel label distribution of the averaged prediction results to generate a corrected label for the image sample.

At block 910, a joint optimization process is performed to continue training the image segmentation neural network model using a combination of the corrected labels and the original labels. For example, a weighing factor $\alpha$ between 0 and 1 can be applied to the loss function associated with the corrected label, and a weighing factor $(1-\alpha)$ can be applied to the loss function associated with the original label, and two weighted loss functions can be summed to derived a cross-entropy loss function that is used to train the model. In some implementations, $\alpha$ can be set to 0.5 to provide equal contributions from the corrected and original labels to the loss function. In other implementations, other values of $\alpha$ can be used to skew the cross-entropy loss function towards the corrected label or the original label. Each of the neural networks being employed (e.g., each of the three neural networks) can perform the joint optimization process and update their respective weight values independently from the other neural networks. At the end of the training process, the resulting weight values from the multiple neural networks can be averaged to derive the final weight values for the neural network model.

Accordingly, a cascaded robust learning framework for the segmentation of noisy labeled images have been described. The technique includes two stages: sample selection stage, and the stage of joint optimization with label correction. In the first stage, the clean annotated samples are selected for network updating, so that the influence of noisy sample can be interactively eliminated in the three neural networks. In the second stage, the label correction module works together with the joint optimization scheme to revise the imperfect labels. Thus, the training of the whole network is supervised by the corrected labels and the original ones. Compared with other state-of-the-art models, the cascaded learning framework keeps high robustness when the training data contains various noisy labels. Experimental results on the benchmark dataset demonstrate that the technique outperforms other methods on segmentation tasks and achieves improved results on the noisy-labels dataset.

Figure 10:
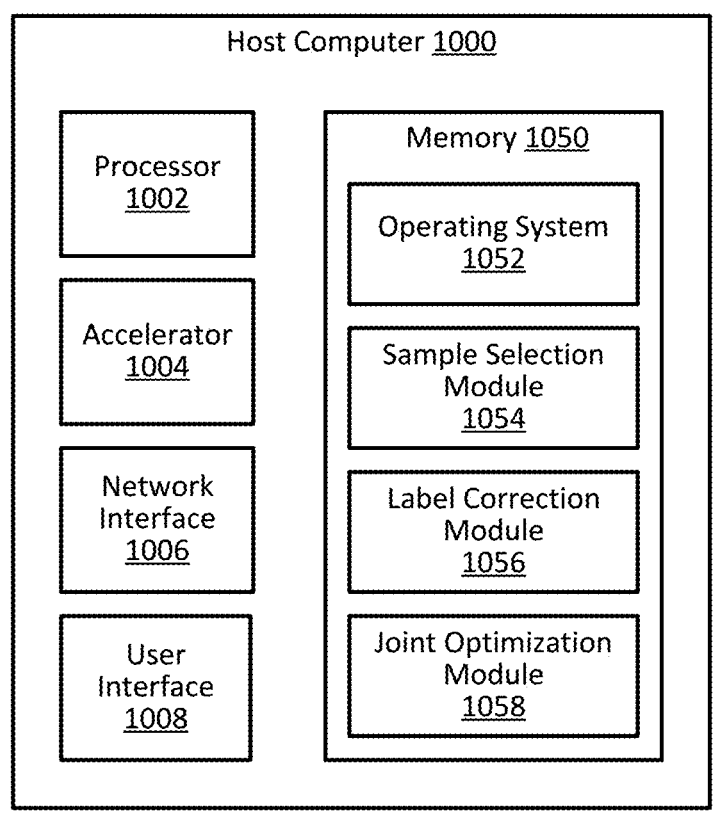
FIG. 10 illustrates a block diagram of an example of a host computing system.

FIG. 10 illustrates a host computer system 1000 that can be used to implement the various aspects of the techniques described herein. Host computer system 1000 may include a processor 1002, an accelerator 1004, a network interface 1006, a user interface 1008, and a non-transitory computer readable memory 1050 storing code executable by processor 1002 and/or accelerator 1004.

Processor 1002 can be implemented as one or more integrated circuits (e.g., one or more single core or multicore microprocessors and/or microcontrollers) and is used to control the operation of host computer system 1000. Processor 1002 can execute a variety of programs in response to program code or computer-readable code stored in memory 1050 and can maintain multiple concurrently executing programs or processes. In some implementations, processor 1002 can be used to execute one or more neural networks that can be trained to perform image segmentation tasks. In some implementations, host computer system 1000 may include an optional accelerator to offload neural network operations. For example, accelerator 1004 may include one or more acceleration circuits such as graphics processing units, neural network processors, systolic arrays, etc. that can be perform neural network operations (e.g., convolution, matrix multiplication. etc.) more efficiently and faster than processor 1002. In such implementations, accelerator 1004 can execute one or more neural networks. Processor 1002 and/or accelerator 1004 can be considered processing logic of the computing system.

Network interface 1006 may include one or more transceivers, connectors, or I/O ports that can be used by host computer system 1000 to communicate with other devices, to connect with external networks, and/or to transfer data using electronic or physical medium. User interface 1008 can include any combination of input and output elements (e.g., pointer device, speaker, display, etc.) to allow a user to interact with and invoke the functionalities of host computer system 1000. The user interface 1008 may include an integrated display (e.g., flat panel display, touch screen, etc.) or can be coupled to an external display.

Computer readable memory 1050 can be implemented using any combination of volatile memories (e.g., DRAM, SRAM), non-volatile memories (e.g., flash memory), and/or any other non-transitory storage medium, or a combination thereof media. Memory 1050 may store an operating system 1052 and a variety of programs and/or algorithms. For example, memory 1050 may store a sample selection module 1054 having instructions to perform the sample selection process as described herein, a label correction module 1056 to perform the label correction process as described herein, and a joint optimization module 1058 to perform the joint optimization process as described here. The sample selection module 1054, label correction module 1056, and joint optimization module 1058 can be integrated as one or more software programs, and can be integrated as part of the program code for implementing the one or more neural networks executing the cascaded learning framework.

The techniques described herein may involve implementing one or more functions, processes, operations or method steps. The functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. The set of instructions or software code may be stored on a computer readable medium, such as a random access memory (RAM), a read only memory (ROM), flash memory, a magnetic medium such as a hard-drive or a floppy disk, a steady state drive, or an optical medium such as a CD-ROM. Any such computer readable medium may reside on or within a single computational apparatus and may be present on or within different computational apparatuses within a system or network. The functions, processes, operations or method steps may be implemented by firmware or a dedicated processor, integrated circuit, processing unit (e.g., ALU), etc.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof. One or more features from any embodiment may be combined with one or more features of any other embodiment without departing from the scope of the invention.

A recitation of "a," "an," or "the" is intended to mean "one or more" unless specifically indicated to the contrary.

What is claimed is:

1. A computer-implemented method comprising:
   receiving, by a computing system, a set of image samples and original labels for the image samples to train an image segmentation neural network model;
   performing, by the computing system, a sample selection process using a plurality of neural networks to select a subset of image samples from the set of image samples;
   training, by the computing system, the image segmentation neural network model using the subset of image samples;
   performing, by the computing system, a label correction process to generate corrected labels for remaining image samples in the set of image samples that were not selected during the sample selection process; and
   training, by the computing system, the image segmentation neural network model using a combination of the corrected labels and the original labels in a joint optimization process.

2. The computer-implemented method of claim 1, wherein the plurality of neural networks includes three neural networks.

3. The computer-implemented method of claim 2, wherein the sample selection process includes updating weight values of each neural network using weight gradients from the other two neural networks.

4. The computer-implemented method of claim 2, wherein the sample selection process includes selecting an image sample to include in the subset of image samples based on a prediction uncertainty on the image sample between two of the neural networks.

5. The computer-implemented method of claim 1, wherein training with the subset of image samples is performed for a predetermined number of epochs.

6. The computer-implemented method of claim 1, wherein the label correction process includes averaging prediction results from the plurality of neural networks.

7. The computer-implemented method of claim 6, wherein the label correction process includes applying a sharpening function to reduce entropy of per pixel label distribution of the averaged prediction results.

8. The computer-implemented method of claim 1, wherein the joint optimization process trains the image segmentation neural network model using a cross-entropy loss function $\mathcal{L}_{total}$:

$$\mathcal{L}_{total} = \alpha \times \mathcal{L}(f(x_i;\theta), \hat{y}_i) + (1-\alpha) \times \mathcal{L}(f(x_i;\theta), \bar{y}_i),$$

where:
   $\alpha$ is a weight factor,
   $\mathcal{L}$ is a loss function of the image segmentation neural network f,
   $\theta$ denotes weights of the image segmentation neural network f,
   $x_i$ is an image sample,
   $\hat{y}_i$ is an original label of the image sample, and
   $\bar{y}_i$ is a corrected label of the image sample.

9. The computer-implemented method of claim 8, wherein the weight factor $\alpha$ is set to 0.5.

10. The computer-implemented method of claim 1, wherein the plurality of neural networks are implemented using U-net neural networks.

11. A computing system comprising:
processing logic; and
a memory coupled to the processing logic, the memory storing code, which when executed by the processing logic, causes the computing system to perform operations including:
receiving a set of image samples and original labels for the image samples to train an image segmentation neural network model;
performing a sample selection process using a plurality of neural networks to select a subset of image samples from the set of image samples;
training the image segmentation neural network model using the subset of image samples;
performing a label correction process to generate corrected labels for remaining image samples in the set of image samples that were not selected during the sample selection process; and
training the image segmentation neural network model using a combination of the corrected labels and the original labels in a joint optimization process.

12. The computing system of claim 11, wherein the plurality of neural networks includes three neural networks.

13. The computing system of claim 12, wherein the sample selection process includes updating weight values of each neural network using weight gradients from the other two neural networks.

14. The computing system of claim 12, wherein the sample selection process includes selecting an image sample to include in the subset of image samples based on a prediction uncertainty on the image sample between two of the neural networks.

15. The computing system of claim 11, wherein training with the subset of image samples is performed for a predetermined number of epochs.

16. The computing system of claim 11, wherein the label correction process includes averaging prediction results from the plurality of neural networks.

17. The computing system of claim 16, wherein the label correction process includes applying a sharpening function to reduce entropy of per pixel label distribution of the averaged prediction results.

18. The computing system of claim 11, wherein the joint optimization process trains the image segmentation neural network model using a cross-entropy loss function $\mathcal{L}_{total}$:

$$\mathcal{L}_{total} = \alpha \times \mathcal{L}(f(x_i;\theta),\hat{y}_i) + (1-\alpha) \times \mathcal{L}(f(x_i;\theta),\bar{y}_i),$$

where:
$\alpha$ is a weight factor,
$\mathcal{L}$ is a loss function of the image segmentation neural network f,
$\theta$ denotes weights of the image segmentation neural network f,
$x_i$ is an image sample,
$\hat{y}_i$ is an original label of the image sample, and
$\bar{y}_i$ is a corrected label of the image sample.

19. The computing system of claim 18, wherein the weight factor $\alpha$ is set to 0.5.

20. The computing system of claim 11, wherein the plurality of neural networks are implemented using U-net neural networks.

* * * * *